United States Patent [19]
Yang et al.

[11] Patent Number: 5,690,600
[45] Date of Patent: Nov. 25, 1997

[54] RETRACTABLE WEB SEPARATOR

[75] Inventors: Sungwook Yang, Deerfield; Dale R. Severs, Gurnee, both of Ill.; David Frankenberger; Michael Kemp, both of Mountain Home, Ark.

[73] Assignee: Baxter International Inc., Deerfield, Ill.

[21] Appl. No.: 293,441

[22] Filed: Aug. 19, 1994

[51] Int. Cl.$^6$ ..................................................... B31B 1/84
[52] U.S. Cl. ...................... 493/212; 493/213; 493/194; 493/195; 493/196
[58] Field of Search ................................. 493/212, 213, 493/189, 194–197

[56] References Cited

U.S. PATENT DOCUMENTS

| | | | |
|---|---|---|---|
| 4,027,577 | 6/1977 | Thompson et al. | 493/212 |
| 4,516,977 | 5/1985 | Herbert | 604/415 |
| 4,530,693 | 7/1985 | Isowa | 493/373 |
| 4,631,905 | 12/1986 | Maloney | 493/196 |
| 4,656,813 | 4/1987 | Baldini et al. | 53/410 |
| 5,437,595 | 8/1995 | Smith | 493/213 |
| 5,484,375 | 1/1996 | Owensby et al. | 493/212 |

FOREIGN PATENT DOCUMENTS

| | | | |
|---|---|---|---|
| 0302357 | 2/1989 | European Pat. Off. | A61J 1/00 |
| 3726064 | 2/1989 | Germany | A61J 1/00 |

OTHER PUBLICATIONS

Ideal Equipment Co. Ltd. 4–page brochure: "Roll Wrapper, Model 505–40RW" (undated).

Shanklin Corporation, 12–page brochure: "Quality Shrink Packaging Machinery, General Catalog", 1988.

Interroll Corporation, 16–page brochure No. C007: "Interroll Meca, Driveroll Electric Conveyor Roller", 1992.

Intralox, Inc., 6–page brochure No. 1161–IN: "All–Plastic Modular Conveyor Belts", 1987.

Intralox, Inc., 72–page booklet No. 1633–IN, Second Printing, "Conveyor Belt Engineering Manual", 1987.

(List continued on next page.)

*Primary Examiner*—Eileen Morgan
*Attorney, Agent, or Firm*—Thomas S. Borecki; Charles R. Mattenson; Richard P. Beem

[57] ABSTRACT

An apparatus (31) and a method are disclosed for temporarily separating multiple webs (51,53) while performing an operation (123,125,133) thereon, including the feeding of multiple webs (51,53), the provision of a retractable web separator (68) for temporarily separating the webs, the performance of an operation (123,125,133)) upon the webs, the provision of a gripping device (65) for gripping the webs and assisting in moving the webs (51,53) along a predetermined path (83), and the provision of a sealing device (71) for sealing the webs together to form a package seal (73). The retractable separators (68) are mounted on a conveyor (83) and each separator (68) in turn temporarily separates the webs (51,53), for insertion of a port (45), fitting or the like, whereupon the separator (68) may be retracted and the port (45) may be sealed into the packages (41) being manufactured. The preferred separator (68) has a shaped head (170) on the end of a reciprocating shaft (158). The head (170) may be enlarged and may have a tapered end (171) for insertion between the webs (51,53).

22 Claims, 11 Drawing Sheets

OTHER PUBLICATIONS

A/S Max Ellesoe, Polymax Belting Inc., 13-page brochure, "Polymax, Manufacturer of PVC and PU Conveyor Belts", undated.

A/S Max Ellesoe, Polymax Belting Inc., 4-page brochure, "Polymax PVC and PU Sidewalls, a Polymax Product", undated.

A/S Max Ellesoe, Polymax Belting Inc., 10-page brochure, "Rubber Conveyor Belting", 1993.

Gerlach & C. s.n.c., 24-page catalog: "Senter Clips and Pin Links", undated.

Paul Kiefel Hochfrequenz-Anlagen GmbH, 6-page data sheet: "Technical Know-How Worldwide", undated.

Paul Kiefel Hochfrequenz-Anlagen GmbH, 6-page data sheet: "Machinery for the Production of Medical Bags", undated.

Paul Kiefel Hochfrequenz-Anlagen GmbH, 6-page data sheet: "Plastics Welding Machines for the Packaging Industry", Mar. 1991.

Paul Kiefel Hochfrequenz-Anlagen GmbH, 6-page data sheet: "Thermocontact Welding Machinery for the Production of Articles made of Polyolefines", undated.

Paul Kiefel Hochfrequenz-Anlagen GmbH, 6-page data sheet: "The Successful Program of Cutting Machinery", Aug. 1993.

Paul Kiefel Hochfrequenz-Anlagen GmbH, 6-page data sheet: "High-Frequency Generator Product Line", undated.

Paul Kiefel Hochfrequenz-Anlagen GmbH, 6-page data sheet: "KLS Custom Designed Automatic Kiefel Linear Indexing Welding Machine", Feb. 1993.

Paul Kiefel Hochfrequenz-Anlagen GmbH, 6-page data sheet: "Plastics Welding Machines for Corrugated Sheets", Dec. 1993.

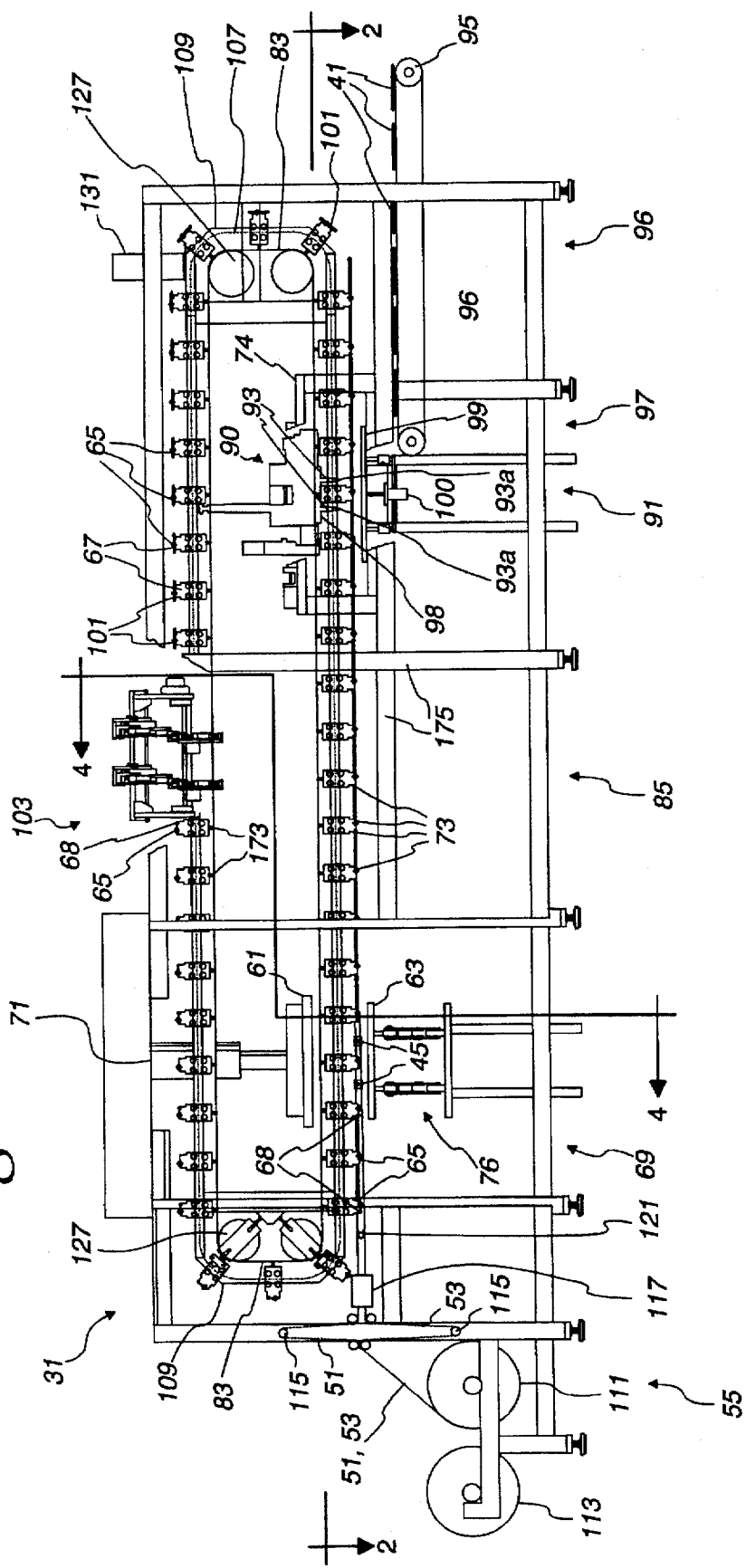

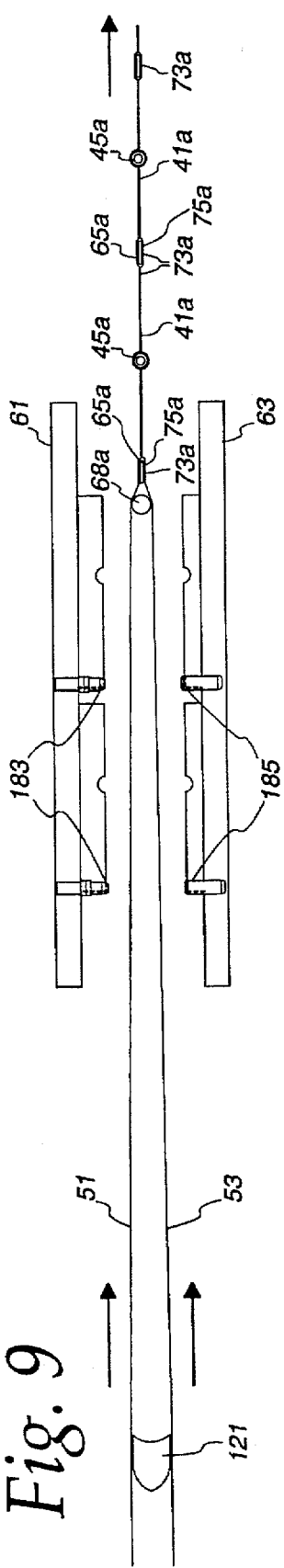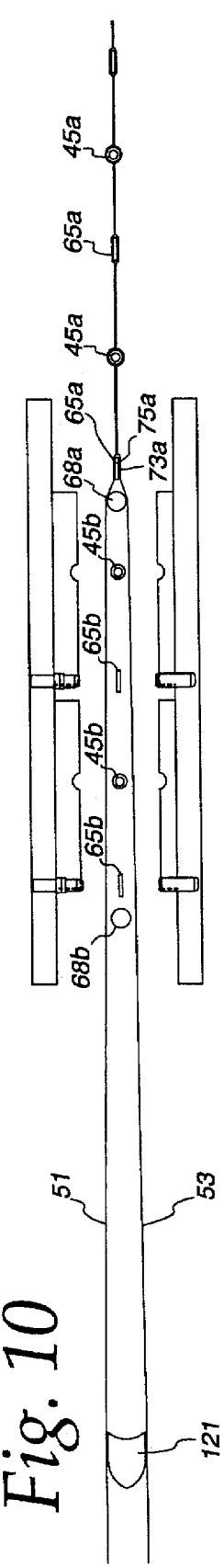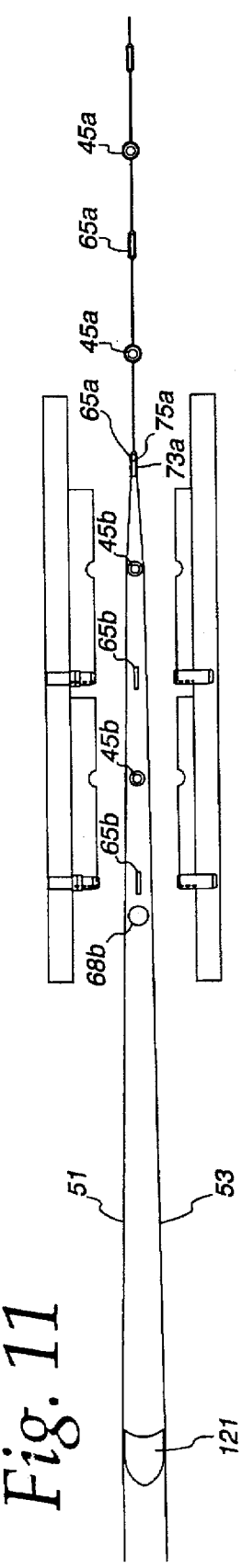

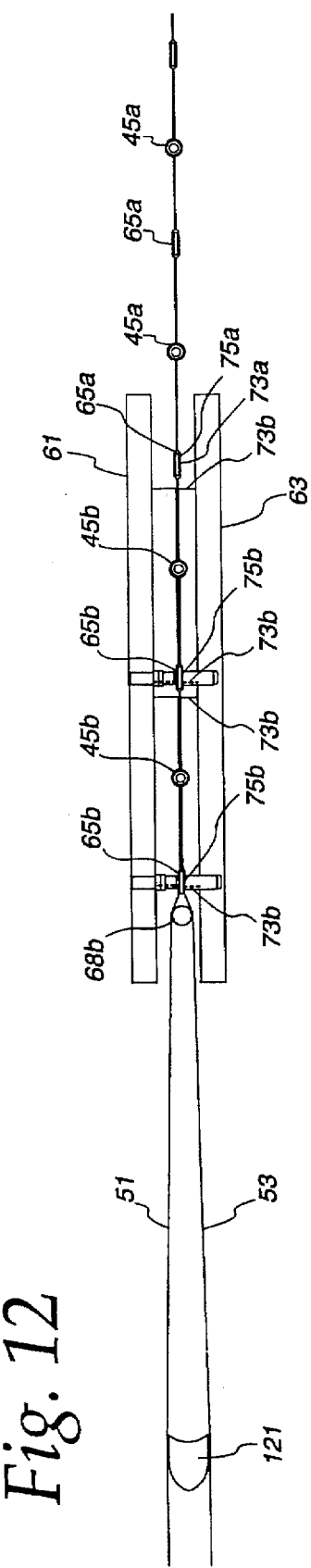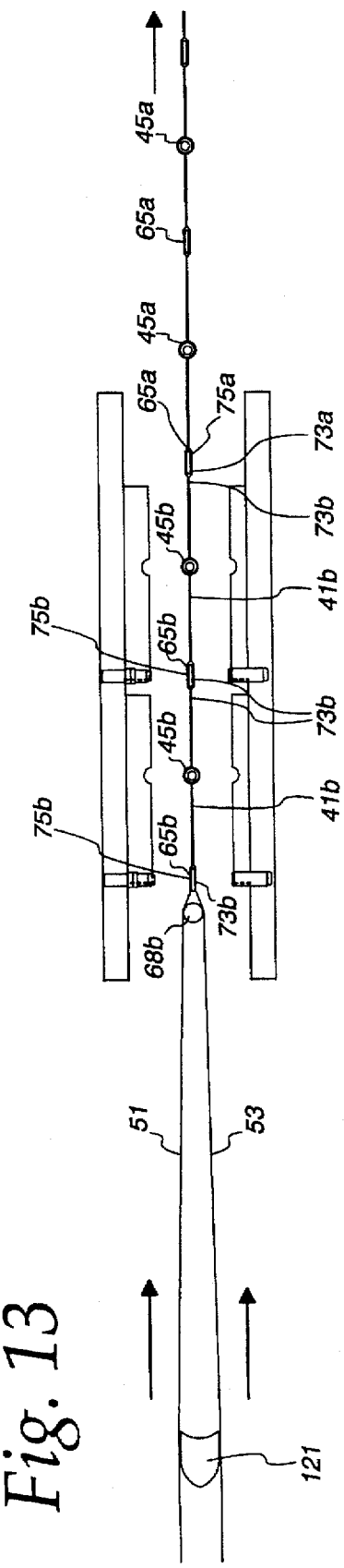

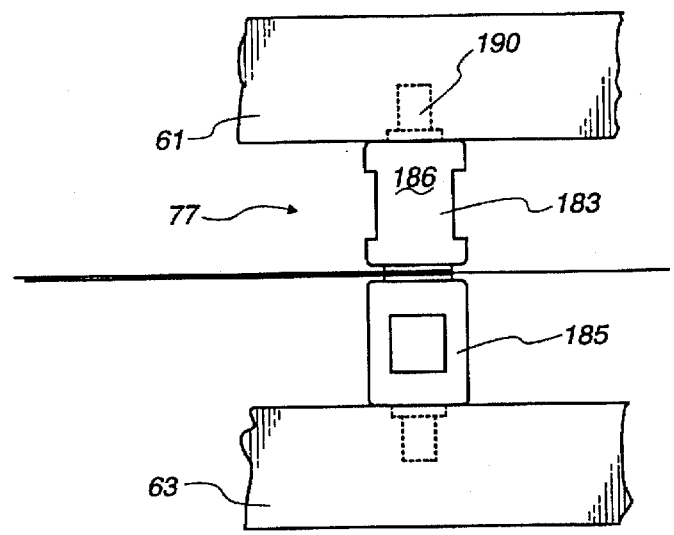
Fig. 17
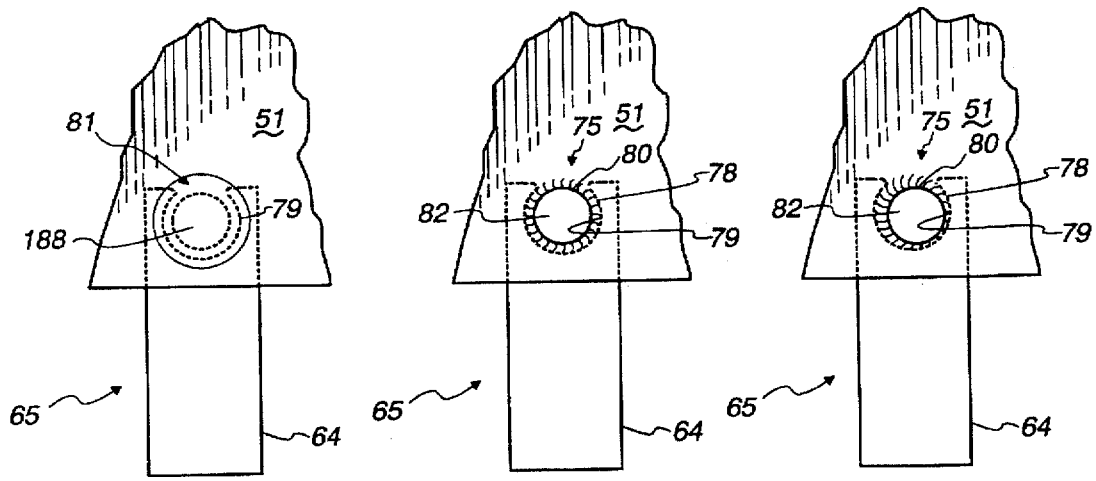
Fig. 18A  Fig. 18B  Fig. 18C
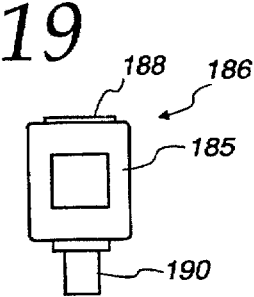
Fig. 19
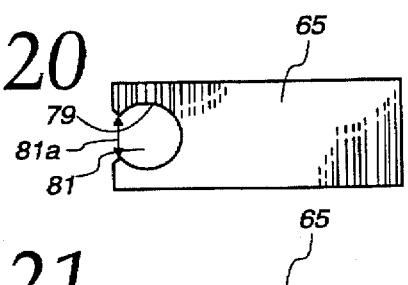
Fig. 20
Fig. 21

1

RETRACTABLE WEB SEPARATOR

BACKGROUND OF THE INVENTION

This invention relates to the handling of two or more sheets or webs of plastic, e.g., for the manufacture of plastic bags.

The present invention is directed to an apparatus and process for using a retractable web separator in order to permit insertion of ports, fittings, or the like between the webs during the manufacture of articles such as bags or the like. The invention will be described in connection with the momentary separation of plastic webs for insertion of ports to be sealed into medical storage bags although the invention is not limited to any particular bag or package. Plastic medical storage bags are known in the art, and have been used for medical purposes for storing blood, infusion solutions, or the like. Such bags typically are filled with a liquid or the like and are provided with at least one outlet in the form of a port or a tube member. A storage bag having such a tube member is disclosed in U.S. Pat. No. 4,516,977 issued to Herbert.

Plastic bags typically are formed in a quasi-continuous series, with the webs being moved through various stations including an unwind station, a sealing station at which ports are introduced and the seals are made, a cutting or severing station to cut the bag from the webs, and bag transfer and discharge stations. The webs are gripped from opposite longitudinal edges by clamps or grippers on endless bands which grip the webs and then pull webs along through the various stations. After one or more bags have been formed in the sealing operation, the bags are advanced or indexed forward and fresh webbing is fed into the sealing area.

When the plastic bag is to be provided with one or more ports, it generally is necessary to insert the ports between the webs prior to sealing the webs together to form the bag seal around the perimeter of the bag and around the ports. The webs typically are separated by a permanent separator placed upstream of the seal station, providing a gap for insertion of the ports. In the prior art, the gap decreases substantially linearly as the webs travel from the permanent separator (where the gap may be expressed as a predetermined dimension "S") to the last-formed seal (where the gap is zero). Because of this geometry, there have been limitations on the size of the ports and the closeness of the ports to the previously formed seal. The prior system has been analyzed by the inventors, and it has been determined that the system may be expressed mathematically as follows: $S=(P+C) \times L/L^*$, where S is the gap between webs as measured at the permanent or stationary separator, P is the outside diameter of the port to be placed closest to the previously formed seal, C is the total clearance desired between the port and the webs (including both top and bottom clearance), L is the length between the permanent separator and the previously formed seal, and $L^*$ is the length between the port and the previously formed seal. For a given length L, there are limitations on the size of the permanent separator, because a large separator creates a steep angle of incline for one or both webs, thereby increasing stress on the webs and the possibility of damage or breakage of the webs, particularly as the sealing dies engage and possibly stretch the webs. Thus, physical constraints inherent in the geometry and components of the prior art systems result in limitations on the size of the port P and the closeness of the port to the previously formed seal.

Other factors making it difficult for a web separator to provide a large enough gap at the desired location for insertion of a given port include the operation of the sealing equipment, which may be in the form of a seal press operated by radio frequency, thermal dies, or the like. If a separator is too close to the dies when the dies are closed for sealing, the separator can be damaged or destroyed and, similarly, the dies and the plastic webs can be damaged or broken. A turret, turntable, and mandrels may be needed for the insertion of ports, but again, this equipment and its operation require substantial space, further limiting the use of a separator in close proximity to the area where ports are inserted. Nevertheless, it would be desirable to provide a web separator which may be placed as close as possible to the previously formed seal, but which will not interfere with other equipment and operations in the same area.

Clamps, grippers, or carriers for conveying the webs must be placed in precise locations close to the sealing press and the port ejecting equipment, requiring further precious space in the area where it would be desirable to place a separator. The articulation of clamps may require complex mechanisms to open and close the jaws thereof. The normal mechanical stretching and play in the endless belt or chain and the other components makes it difficult to stay within the required tolerances. A novel carrier for improved conveying of the webs is disclosed herein, but regardless of the conveying mechanism selected, it would be desirable to provide a web separator which may cooperate with operation of the endless belt as well as the clamps, grippers or carriers.

Still another problem to be confronted with regard to the prior art is the problem of static electricity. The mechanism of bringing multiple webs together in close proximity results in the likelihood of abrasive friction, particularly if die profiles or leading edges are used to create separation between the webs for insertion of the ports. Abrasive friction, in turn, causes static electricity, contributing to the difficulties of material handling. It would be desirable to provide a web separator that does not add substantially to the static electricity problem, and that may alleviate the problem to some extent by reducing the need for abrasive die profiles or leading edges.

In the manufacture of plastic bags from webs, it is desirable to provide flexibility with regard to the method, the apparatus, and the product or products. It also is desirable to minimize product costs, which includes minimizing the amount of scrap material. A novel retractable separator may result in less scrap material, e.g., by permitting ports to be introduced closer to the previously formed seal and thus permitting the bags to be closer together with less scrap in between the bags.

The prior art methods and apparatus have limitations and deficiencies, regarding the provision of a web separator which will provide an adequate gap for the insertion of ports at the location desired, without interfering with other equipment and operations being performed in the same area. These limitations and deficiencies result in increased capital, operating, and maintenance requirements and costs, and in reduced productivity.

Thus, it is an object of the invention to overcome one or more of the problems of the prior art.

An object of the invention is to provide a novel retractable web separator for use in formation of packages from plastic webs and to apparatus and methods using the same. Other objects of the invention will become apparent from the specification (of which this background is a part), as well as the claims and the drawings.

SUMMARY OF THE INVENTION

In accordance with the present invention, upper and lower webs or sheets are kept more uniformly spaced apart not only at the rear (upstream) end seal location for the plastic bag, but also adjacent the forward (downstream) end seal location for the plastic bag. This is achieved by the use of a retractable web separator at the forward seal location that travels with the webs holding them parallel and apart adjacent the downstream seal location until an operation, such as the insertion of ports between the webs, is accomplished, after which operation the retractable separator is removed from between the webs. Herein, the retractable separator travels with the webs at their travel speed to allow insertion of ports close to the downstream seal location and to allow insertion of multiple ports including one of these ports closely adjacent the downstream seal location. The separator may be paired with a movable carrier and travel in endless path with the carrier and may be inserted between the webs while the webs are traveling. Alternatively, the separator may be inserted during a momentary pause in the forward motion of the webs. The separator may be retracted prior to the sealing operation while the webs are momentarily paused in their formal motion. Alternatively, the separator may be retracted while the webs are travelling, but preferably before the dies are closed. In either case, the separator may continue to travel with the pallet until it again reaches the vicinity of the seal station in the next cycle of the endless belts.

BRIEF DESCRIPTION OF THE DRAWINGS

FIG. 1A is an elevation view of the apparatus for manufacturing plastic bags;

FIG. 9 is a sectional view of the apparatus taken along lines 9—9 of FIG. 3;

FIG. 10 is a sectional view of the apparatus taken along lines 10—10 of FIG. 5;

FIG. 11 is similar to FIG. 10 except that it shows the apparatus at a subsequent phase in the manufacturing cycle;

FIG. 12 is a sectional view of the apparatus taken along section lines 12—12 of FIG. 7;

FIG. 13 is similar to FIG. 12 except that it shows the apparatus at a subsequent phase in the manufacturing cycle;

FIG. 17 is an elevation view showing a typical button assembly;

FIG. 18A is a plan view of the carrier of the invention shown with a button seal being formed;

FIG. 18B is similar to FIG. 18A except that it shows the carrier and the seal after the seal has been formed;

FIG. 18C is similar to FIG. 18B except that it shows the seal having been formed off-center with respect to the carrier opening;

FIG. 19 is an elevation view of a typical lower button assembly;

FIG. 20 is a plan view of a novel carrier;

FIG. 21 is an elevation view of the carrier shown in FIG. 20;

DETAILED DESCRIPTION OF THE INVENTION

Figure 1:
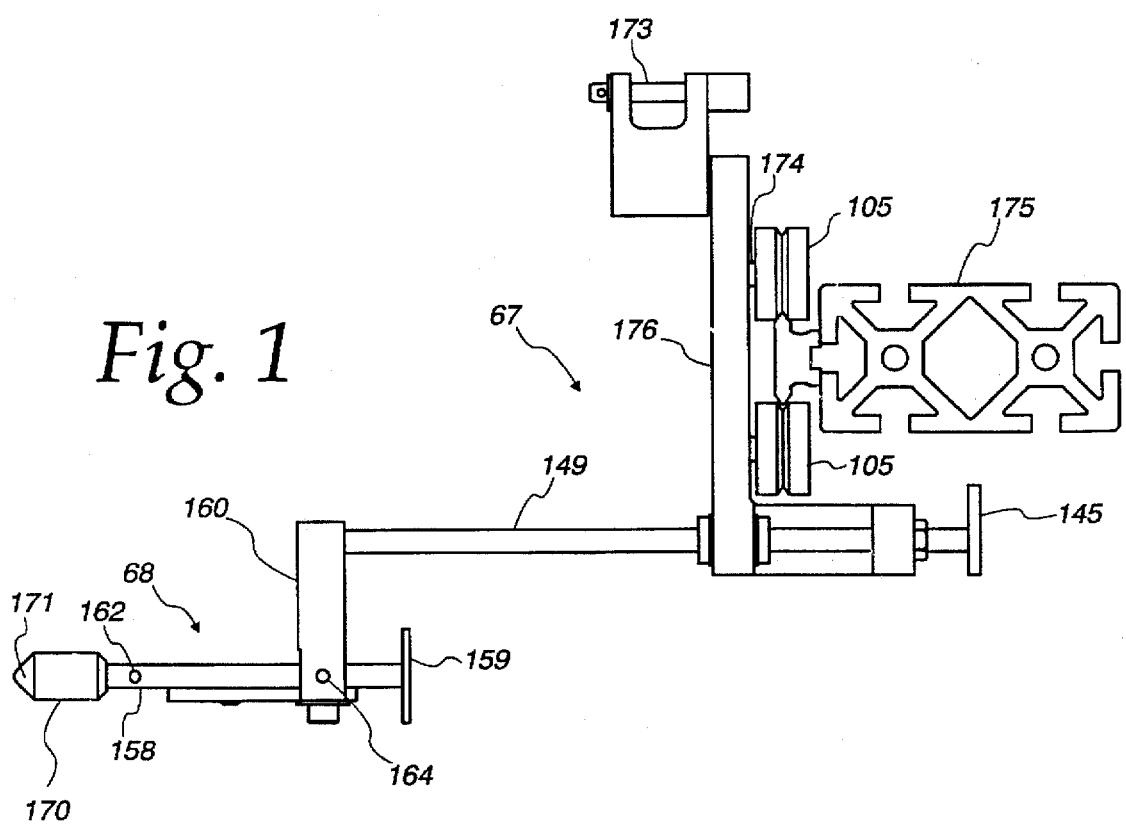
FIG. 1 is an elevation view of the retractable web separator of the invention, shown mounted on a pallet.

In accordance with the invention, an apparatus 31 and method for handling multiple plastic webs 51,53, FIG. 1A, make use of a novel retractable web separator 68, FIG. 1.

An apparatus 31, FIG. 1A, making use of separator 68 for forming plastic bags 41 or similar articles will be described with reference to the manufacture of plastic bags 41 having applicability to a wide range of uses, including medical purposes, e.g., for receiving and/or storing blood, transfusion solutions, sterilizable parenteral products, or dialysis fluids. The present invention is not limited to any particular bag or package.

In the art, the layers of plastic can be referred to as "webs," "webbing," "sheets," "sheeting," or "films," and, in this application, the aforementioned terms will be considered as interchangeable unless clearly intended otherwise.

The specification, claims, and drawings of the commonly assigned application entitled, "Multi-Web Carrier," (inventors Severs, et al.) filed on the same date as this application, are incorporated by reference as if fully reproduced herein.

Figure 22:
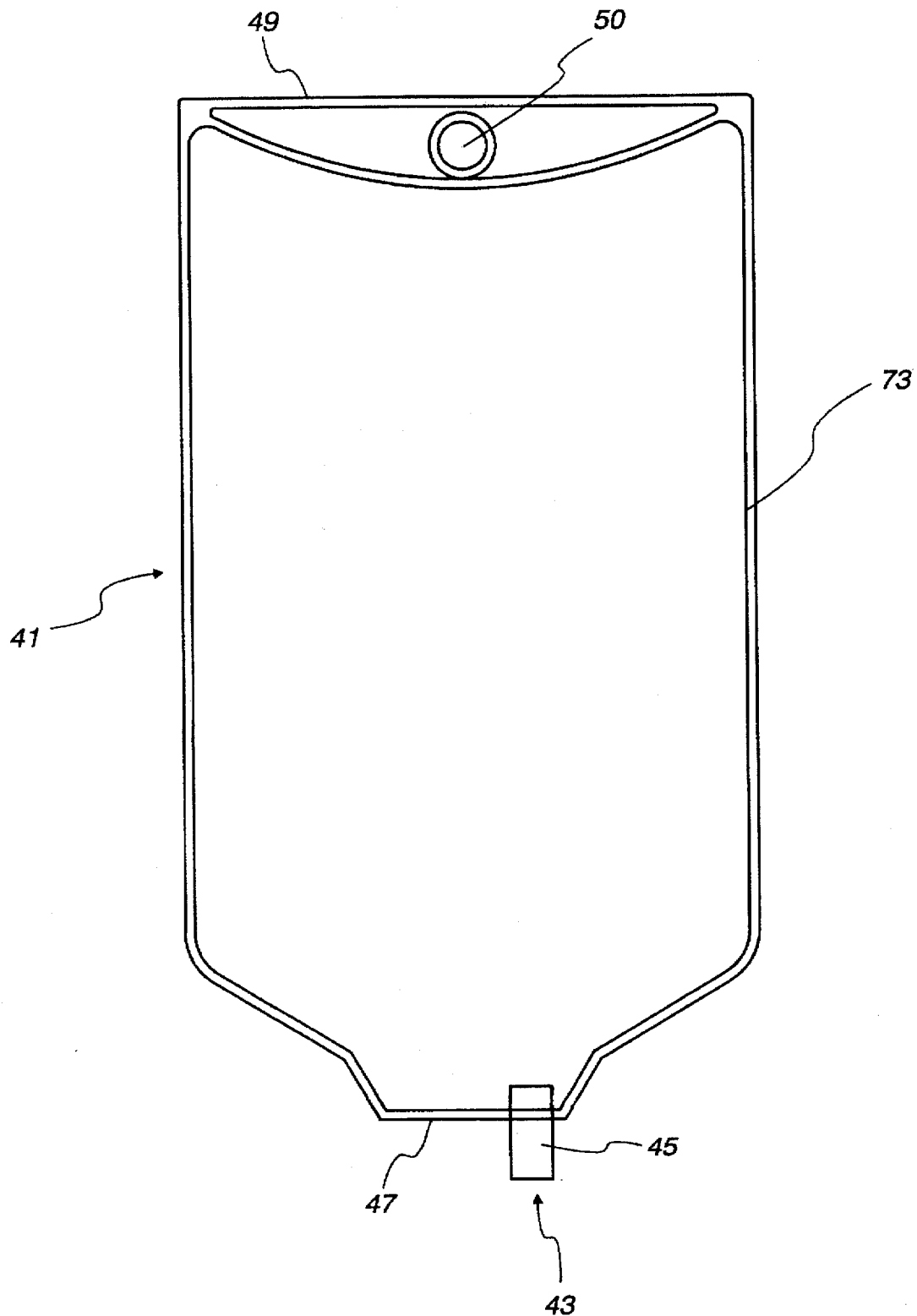
FIG. 22 is a plan view of a typical plastic bag formed in accordance with the invention.

A typical plastic bag 41, FIG. 22, which may be of a standard three liter size and shape, or such other size and shape as may be desired. The bags 41 may be provided with one or more outlets 43 in the form of ports or tube members 45. Since the bag 41 may be suspended with the tube member 45 at the bottom 47 to enable the contents to flow out easily, edge 49 opposite the tube member(s) 45 may be provided with an opening 50 into which a hook like securing member of a stand or the like may be introduced to secure or position the bag 41. A bag seal 73 is shown around the perimeter of the bag.

It will be understood that the invention is equally applicable to the manufacture of various types of packages or articles 41, or of a product still in the form of a continuous web, formed from multiple webs 51,53 or sheets of plastic material. The web material preferably may be polyvinyl chloride (PVC), or it may be another plastic material capable of extrusion.

The apparatus 31 as shown in FIG. 1a is essentially a modular arrangement, making use of various stations as shown, and permitting flexibility in the design, layout, and operation of such stations, as well as possible incorporation of other stations, equipment, or operations.

The apparatus 31 forms packages from a pair of webs 51 and 53 that are provided from a supply or unwind station 55 and travel therefrom around (above and below) a stationary separator 121 to a sealing station 69 at which seals 73 are made to join the webs and to form the package. As the webs enter the sealing station, retractable separator 68 is inserted between the webs to enable ports to be inserted. Carriers 65 on endless belts or bands 83 are brought into engagement with the webs to carry the now formed bags forwardly to a cutting or severing station 91 at which the bags are separated from the remainder of the webs. The bags are transferred from the cutting station 91 through a transfer station 97 to a discharge station 96 at which the bags are discharged.

As the traveling webs 51 and 53 enter the sealing station 69, it is preferred that the webs be at a precise elevation and that the grippers or carriers grip the formed package at precise locations relative to the seals 73, outlets 43 or hook openings 50 so as not to interfere with the formation of the seals 73 or the insertion of the ports or tube members 45.

In accordance with the present invention, the apparatus 31 is provided with retractable web separators 68 which are inserted between the webs in order to provide sufficient separation or clearance between the webs for insertion of ports 45 at the desired location, which may permit the ports to be larger and/or closer to the previously formed bag seal than would be the case without the separator.

Basically, the retractable web separator 68 is a device which keeps two or more layers of material separated. Preferably, it is an intimate part of the material handling system provided by apparatus 31. The separator 68 keeps the webs separated by the desired gap or distance, at the desired location, for the desired period of time, to allow any type of operations to be performed between the layers of material. The separator can be retracted when the operations are finished or when the separation is no longer needed. The advantages of the retractable web separator include the capability of inserting ports, fittings, or the like between the webs in close proximity to obstacles such as a previously formed seal between the webs. The use of the retractable web separator lessens the amount of separation required from an upstream stationary separator.

In general, the separation required at both the stationary separator 121 and the retractable separator 68 may be expressed as S=P+C, where S is the separation, P is the outside diameter of the largest port to be inserted between the separators, and C is the total clearance between the largest port and the webs. This example assumes that both separators (stationary and retractable) are of equal breadth, which is preferred for the embodiment shown, but other variations are possible and are within the scope of the invention.

The use of the retractable separator 68 of the invention permits a minimum amount of separation between the webs 51,53 and the operating mechanisms, which is desirable because it reduces stress and abrasion on the webs. In particular, it is desirable to keep the webs relatively flat for engagement by the sealing dies, because as the angle between the webs and the horizontal plane increases, there is an increasing possibility of breakage or damage to the webs as the upstream edges of the dies contact the webs and force them into substantially horizontal alignment between the die surfaces. The required separation at the stationary separator 121 is reduced by the factor of L/L*, where L is the distance between the stationary separator 121 and the previously formed seal, and L* is the distance between the closest port and the previously formed seal. The presence of the retractable separator keeps the layer apart and from sagging.

The retractable separator 68 prevents abrasion on the material because the separator preferably is indexed with the material. The avoidance of abrasion, in turn, minimizes breakage or damage to the material, and further minimizes the accumulation of undesirable static electricity.

The retractable separator of the invention permits simple motions of the operations performed between the layers of the material. The separator allows direct access between the layers by simple in-and-out motion at any given time desired. Moreover, unlike the prior art, there is no need to synchronize the motion of the webs and the mechanisms performing the operations in the preferred embodiment of the apparatus and method. This is because preferably the retractable web separators, the gripping devices, and the webs themselves all are operatively connected to a pair of endless belts, thereby automatically providing synchronous motion for the aforementioned components of the system.

The retractable web separator 68 permits access to operate on all sides of the webs as well as in between the webs. The layers of material stay substantially parallel to each other and the direction of indexing or movement.

Figure 14:
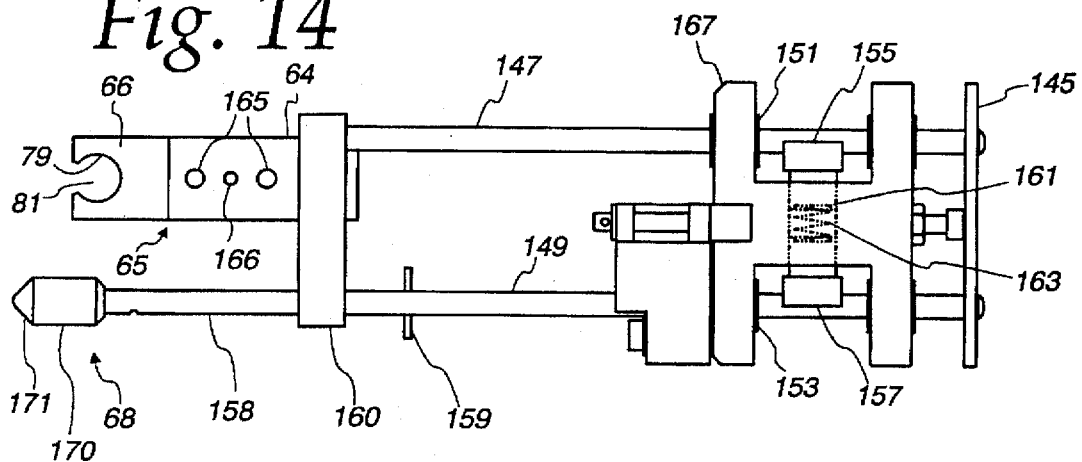
FIG. 14 is a plan view of a pallet provided with a carrier and a retractable separator, an elevation view of which is provided in FIG. 1.

The retractable web separator 68 of the invention may be mounted on a pallet 67, FIGS. 1 and 14. The separator 68 preferably includes a head 170 with a tapered nose 171 for insertion between two or more webs, as discussed in greater detail below. The separator 68 also may be provided with a separator shaft 158 which, in turn, is mounted on and reciprocates through secondary plate mandrel 160. Detents 162 are provided on separator shaft 158, for engagement by the plate mandrel 160, in order to maintain the separator shaft in a selected position. The separator head 170 is mounted on one end of the separator shaft 158, while the other end of the shaft is provided with a secondary push plate 159, for engagement by a pusher and/or a retractor. The plate mandrel 160 is mounted on two primary shafts 147 and 149, see FIG. 14, which in turn are mounted on and reciprocate through plate mandrel 167, by engagement of primary push plate 145. The pallet 67 is adapted to be mounted on an endless belt 83, FIG. 1a, by cog pin 173, with bearings 105 adapted for travel on a track attached to framework 175. The separator pallet 67 may also be provided with, or operate in conjunction with, a clamp, gripper or carrier for conveying the webs. The pallet 67 may be pulled by the endless belt 83 while the pallet is being guided by bearings 105 travelling along a track 107 mounted on frame 175. In the preferred embodiment shown, pallet 67 is provided with a novel carrier 65, also designed for insertion between the webs, having an opening 81 through which the webs may be sealed together to form a carrier seal for conveying the webs, FIG. 14. The retractable web separator 68 may be made from a suitable material which may be a metal such as steel. Its dimensions will depend on the size of the webs being handled, the size and location of ports, fittings, or the like to be inserted between the webs, the dimensions of the articles to be formed, and the positioning of the pallets and other components of the apparatus 31. In general, however, it may be desirable for the diameter of separator head 170 to be about 30–40% larger than the diameter of the ports to be inserted, to allow adequate clearance.

The apparatus 31 also is provided with clamps or grippers or, preferably, with carriers 65 (FIGS. 18A–C) which advance the webs 51, 53 and the bags being made from the webs. The carriers 65 are inserted between the webs prior to the webs being sealed and the carriers remain between the webs after the seals 73 are formed. The carriers 65 do not interfere with such package seal even though the carriers are still between the sealed webs and the carriers are later disconnected from between the webs without interrupting the bag seal 73 formed between the webs. This is achieved by inserting the carriers into peripheral areas 51a,53a of the webs (FIG. 4) exterior of the package seals and forming a carrier seal 75 portion adjacent the carrier against which the carrier 65 bears to carry the now formed package and webs forward in their travel, FIG. 3. The carriers 65 on opposite sides of the webs push against the upstream sides of the carrier seals as the endless bands 83 transport the carriers forwardly from left to right as viewed in FIG. 1. The carriers have edges 79 that push on adjacent, abutted edges 70 of the carrier seals to pull the webs from the left to right as viewed in FIGS. 18A–C.

In accordance with another aspect of the invention, separator 68 is an integral part of the material handling apparatus 31, keeping the webs separated at the desired location and allowing any type of operations to be performed between the layers of material. The web separator may be retracted when the operations are finished and/or when the separation is no longer needed.

The carriers 65 need not be precisely positioned relative to the webs 51, 53 because during formation of the carrier seals 75, the plastic materials of the respective webs extrude outwardly to engage the carrier edges 79 even though the carrier edge may not be precisely positioned. This is important where the carriers are carried along a long, endless path and travel through different planes than the webs travel; and the positions of the carriers may vary slightly relative to the fixedly located sealing assembly 77 (FIG. 1a) that extrudes the plastic carrier seals. As best seen in FIGS. 18A–C, the preferred carrier sealing is done by a thermal sealing assembly that forms a generally circular seal that extrudes outwardly radially to form an annulus or peripheral portion 80 about a central portion 82 of the carrier seal 75. That is, the carrier seal is formed with a central portion 82 of a diameter less than the diameter of the opening 81 (FIG. 18A–C) defined by the edge 79 on the carrier and the plastic extrudes across the annular space to abut the edge 79 of the carrier.

The illustrated apparatus will now be described in greater detail referring to FIG. 1a and to FIG. 2, in the area generally designated as the seal or press station 69, several operations are performed including the introduction of a retractable web separator 68 and the carriers 65 between the two webs 51,53 in the area of the dies 61,63, as will be discussed in further detail below. The use of these novel devices may eliminate the need for die profiles or leading edges sometimes used to create a gap between the webs, which also may eliminate significant abrasive friction and resultant static electricity. The carrier 65 preferably is thin, simple, and non-articulating. One or more ports 45 may be introduced between the webs 51,53 to provide ports in the furnished articles. The dies 61,63 of the press 71 are moved together in order to form a product seal 73, which also may be referred to as an article seal, a package seal, or other product seal, depending on the nature of the product to be formed. At the seal press 71, the upper die 61 preferably is raised and lowered by a piston 74, while the lower die 63 preferably is actuated by a toggle mechanism 76.

At the same time that the package seal 73 is formed, the carrier seal 75 is formed by a dielectric button assembly 77 carried on the respective upper and lower dies 61 and 63, FIG. 17. The buttons 188 compress the webs and meet and extrude the webs 51,53, forming the carrier seal 75 between the webs. Preferably, the buttons will be sized slightly smaller in outside diameter than the inside diameter of the opening 81 in the carrier 65, FIGS. 18A–C. In operation, it is preferable to center the button in the opening 81, FIGS. 18A–B. Because of the tolerance between the button 188 and the edge 79, the carrier 65 will be operative even if the carrier seal is formed off-center with respect to the carrier opening 81, FIG. 18C. The button diameter may be about 50–97% of the diameter of the opening in the carrier head, and preferably may be about 70–80% of the diameter of the opening. In the example shown, the button diameter is ⅜", while the opening is ½".

Figure 2:
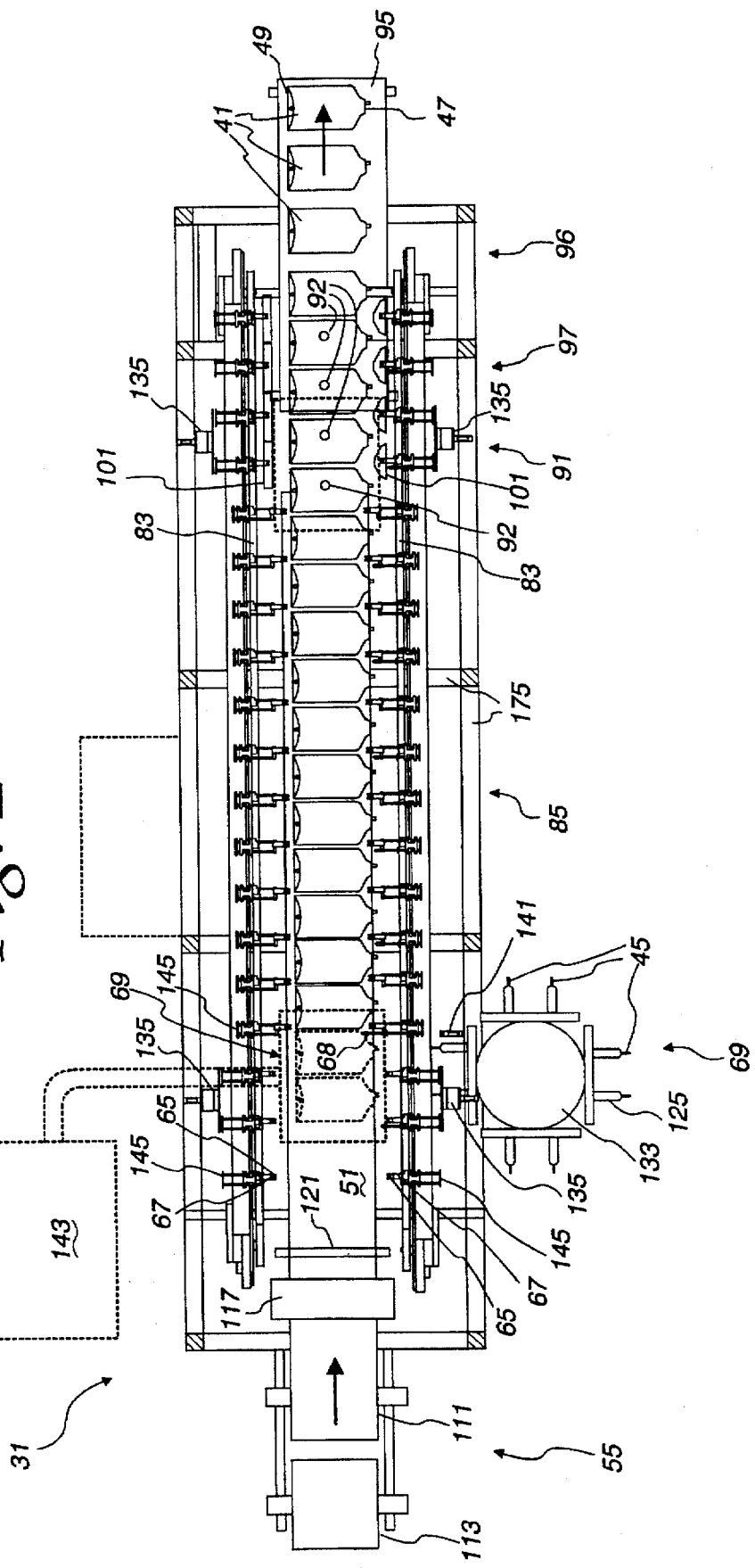
FIG. 2 is a sectional view of the apparatus taken along lines 2—2 of FIG. 1A.

With reference to FIGS. 1a and 2, the webs 51,53 are conveyed by the carriers 65 along a predetermined path defined by a pair of endless belts 83 for further manufacturing operations, including any desired operations to be performed in the optional station designated spare station 85. For example, the package 41 may be printed, punched, or the like.

Additional stations may be provided in the apparatus 31 if desired. The apparatus 31 and method may be used in conjunction with sterile kill, aseptic air fill, or product fill stations, either within the framework of the apparatus 31 and method disclosed, or as subsequent operations.

Other apparatus and operations which may be incorporated into or used in conjunction with the apparatus and method of the invention, include cleaning the webs 51,53 by ultrasound radiation and/or by washing with water or appropriate solutions, drying the webs, sterilizing the webs with ultraviolet rays or other methods, welding portions of the webs together, radiation cross-linking to improve heat resistance and/or to render inlet/outlet tubes 45 steam sterilizable, filling the interior of the webs with fluid either before, during, or after the plastic bags 41 have been cut from the webs 51,53, testing the integrity of the bags, and such other apparatus and operations as may be suitable for use with the apparatus and method disclosed herein. The preferably modular nature of the apparatus 31 permits flexibility in the number, arrangement, and use of the various stations.

Referring now in greater detail to the unwind station 55, in the preferred embodiment as shown in FIG. 1a, if the end product is to be formed from two webs 51,53, both webs will be wound onto a single spool 111. This is made possible by the original loading procedure onto the spool 111, whereby the two webs 51,53 have been superimposed and wound onto the spool, thereby making it possible to unwind both webs at the same time from a single spool. A second spool 113 may be used either as a spare spool for when the first spool 111 runs out of material, or as a separate feed for top web 51, in which case the first spool 111 would feed the bottom web 53. Alternatively, the second spool 113 may be placed generally vertically above the first spool 111 at the desired elevation (not shown). Again, alternatively, if three webs are desired, the first two webs 51,53 may be unwound from the first spool 111 and a third web (not shown) may be unwound from a second spool 113. It will be understood that as many webs and spools as are desired can be used in the apparatus 31 of the invention.

Another alternative for the unwind station 55 involves using a single spool 111 of plastic webbing, but with the material being twice as wide as each of the webs used downstream in the apparatus. The double-wide webbing in this embodiment (not shown) may be processed using a forming plate and a splitting mechanism which may cut the double-wide webbing into two webs of the desired width, inverting one of the webs, and placing the webs in the desired facing and substantially parallel relationship as shown downstream of unwind station 55. Other alternative feeding mechanisms may be used.

The desired number of webs having been provided from the unwind station 55, the webs 51,53 then proceed through one or more dancing rollers 115, FIG. 1a, which serve the purpose of taking up slack, providing the desired amount of tension, and assisting in achieving the desired alignment of the webs 51,53. Generally, at least one dancing roller 115 is provided for each web. There can be multiple dancers used in the system 31, which could involve up to six loops or more. The webs then are fed through a web alignment sensor 117, which is operatively connected to the mechanism of the unwind station 55 and the dancing rollers 115 in order to provide the proper alignment of the webs 51,53. The webs 51,53 then pass on either side of (above and below) a stationary separator 121, which provides a separation by a predetermined distance between the webs 51,53 at a given location in the overall apparatus. A gap having been provided between the webs, the retractable web separator 68 of the invention and the carrier 65 then are inserted between the edges of the webs 51,53 to permit further processing, FIGS. 3,4. In the embodiment shown, the apparatus 31 is set up as a "two-up" machine, that is, two plastic bags 41 are formed in each sealing operation. In such an arrangement, it is preferred to provide an even number of carriers 65 and pallets 67 on each side of the apparatus 31. Alternatively, the sealing operation may be performed on a single bag 41 at a time, or on three, four, five or more bags 41 at a time. The number of carriers 65 to be provided in the system 31 may need to be adjusted accordingly to provide an integer multiple of the number of bags formed in each pressing operation. In the preferred embodiment, shown as a two-up machine, a separator 68 is provided on alternative pallets 67 on the port-loading side of the apparatus 31, FIG. 3. Separators are not required on the opposite side of the apparatus for the embodiment shown.

At the seal station 69, two pallets 67 on each side of the webs 51,53 will be brought into the vicinity of the webs at the desired elevation to insert the respective carriers 65 between the webs, FIG. 2. A retractable separator 68 will be introduced between the two webs 51,53 along the edge where the port or ports 45 are to be introduced. Generally, the separator 68 will define the leading edge of movement between the webs, for those pallets 67 in which both a separator 68 and a carrier 65 are provided. When the webs 51,53 have proceeded to the desired location for processing in the seal station 69, the carriers 65 and the separator 68 are inserted between the edges of the webs 51,53, FIGS. 5,6. The desired number of ports 45 then are inserted from a turret mechanism 123 into the gap between the webs 51,53, usually on one side of the webs, which may involve one port 45 for each plastic bag 41 being formed. Alternatively, two, three, four, or more ports 45 may be inserted for each plastic bag 41. For a two-up seal press 71, two ports 45 may be inserted into the area of the dies 61,63, with one port 45 to be provided for each of the two plastic bags 41. Depending on the number of bags 41 formed and the number of ports 45 in each bag 41, it is possible to insert as many as twelve or more ports 45 in a single operation of press 71. After the ports 45 have been introduced, the separator 68 will be retracted and then the dies 61,63 will be moved together to form the package seal 73 as well as a carrier seal 75 for each carrier 65 placed between the dies 61,63, FIGS. 7,8 and 12.

The dies 61,63 then are moved apart and the webs 51,53 are moved downstream to the next indexing location. The process of providing the desired seals 73,75 and inserting the desired ports 45 is then repeated at the sealing station 69. The movement of the ports 45 into the desired location and the withdrawal of the turret 123 is known as "ejection." The turret 123, see FIG. 4, may be reloaded with additional ports 45 through the use of mandrels 125, at a mandrel reloading station (not shown). Two endless belts 83, one on each side of the webs 51,53, are moved along sprockets 127 (FIGS. 1a and 2) by a conveyor drive motor 131, FIG. 1a.

Figure 15:
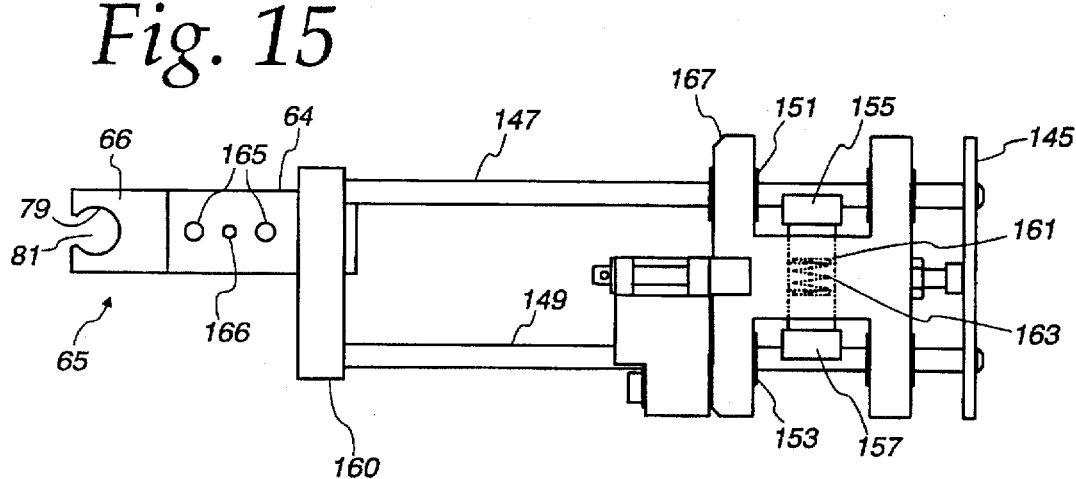
FIG. 15 is similar to FIG. 14 except that it shows a pallet without a retractable separator.

The pallets 67 are mounted on the endless belts 83, FIG. 1a, and the carriers 65 and retractable separators 68 are mounted on the pallets 67, FIGS. 14 and 15. Other pallets are provided with only a carrier and not a separator, FIG. 15. Adjacent the seal station 69, and laterally disposed thereto, is a turntable 133, FIG. 2, mounted on a turret 123, FIG. 4. The turret 123 moves back and forth between a mandrel load station (not shown), where tubes or ports 45 are loaded onto the mandrels 125 on turntable 133, to the seal station 69 where the ports 45 are ejected from the turntable 133 into the webs 51,53. A pushing device 135 on each side of seal press 71 is used to push the carriers 65 and the retractable separator 68 in between the edges of the webs 51,53. A separator-retractor 141 also is provided for retracting the separator 68 after the ports 45 have been loaded and prior to operating the seal press 71.

The seal press 71 is operated in connection with a radio frequency generator 143, the generator 143 being used to plasticize the webs 51,53 and to form them into the desired shapes as provided by the design of the dies 61,63. The radio frequency generator 143 preferably is located near the seal station 69 and disposed laterally thereto.

Figure 4:
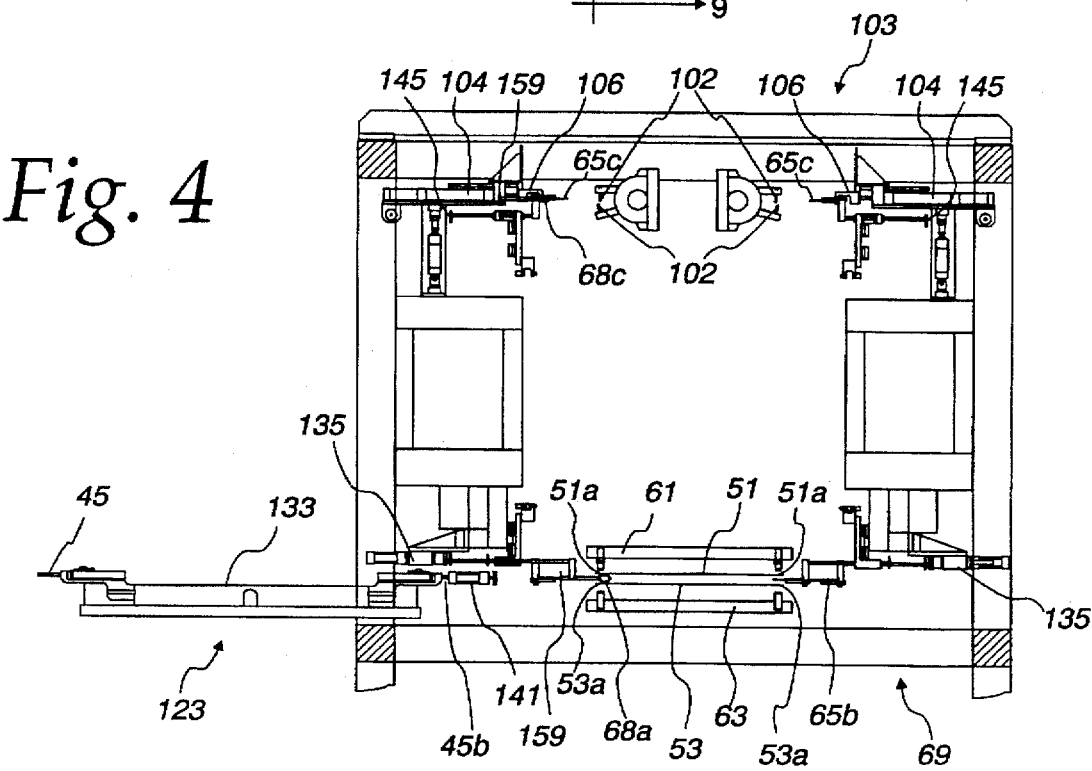
FIG. 4 is a sectional view of the apparatus taken along lines 4—4 of FIG. 1A.

In FIG. 4, the seal or press station 69 is shown with the dies 61,63 open, and the carriers 65b are shown on each side of the webs 51,53, in a retracted position prior to being moved by the pusher 135 into the gap at the edges 51a,53a of the webs 51,53. Similarly, a separator 68a is shown on the port-side of the webs 51,53 into which ports 45b will be ejected. The turret 123 is shown in the retracted position. At the return track approaching the top of the seal station 69, one may observe the separator 68c and the carriers 65c in the retracted positions. The bags 41 have been removed at the bag transfer station 97, FIGS. 1 and 2. On the return track shown at the top of FIG. 4, the carriers 65c carry scrap material 101 to the scrap removal station 103, where the scrap is removed by grippers 102 and the carriers 65 are retracted by carrier placement cylinders 104 and carrier catcher positioners 106, while the separator 68c is extended relative to the pallet 67.

Figure 3:
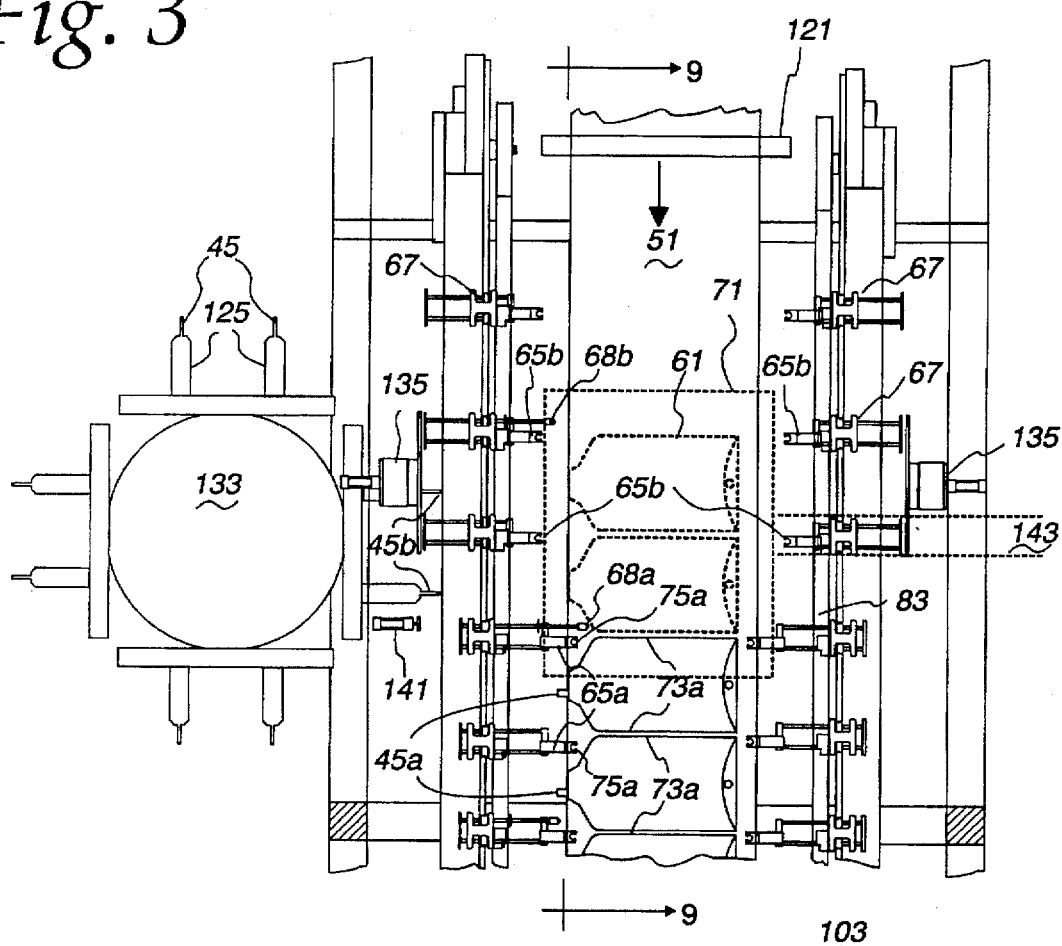
FIG. 3 is an enlarged portion of FIG. 2 in order to more clearly illustrate the seal station area of the method and apparatus.

In operation of the seal station 69, the webs 51,53 having been moved into the desired location for sealing, the separator 68a is in place between the webs 51,53 at the peripheral edges 51a,53a, and at the downstream edge of the dies when the webs are stopped, FIGS. 3, 4 and 9. The separator 68a provides a predetermined gap between the web edges 51a, 53a. The inserted separator 68a being upstream of the package seal 73a formed during the previous cycle allows sufficient space between the webs 51,53 to permit the ports 45b to be introduced at the desired locations, which may involve larger ports and/or locations closer to the previous package seal 73a than would be the case without the separator 68a. The ability to insert ports 45 in close proximity to previously formed package seal 73a is significant because it reduces the amount of space needed between die operations, and hence, reduces the amount of scrap material.

Figure 5:
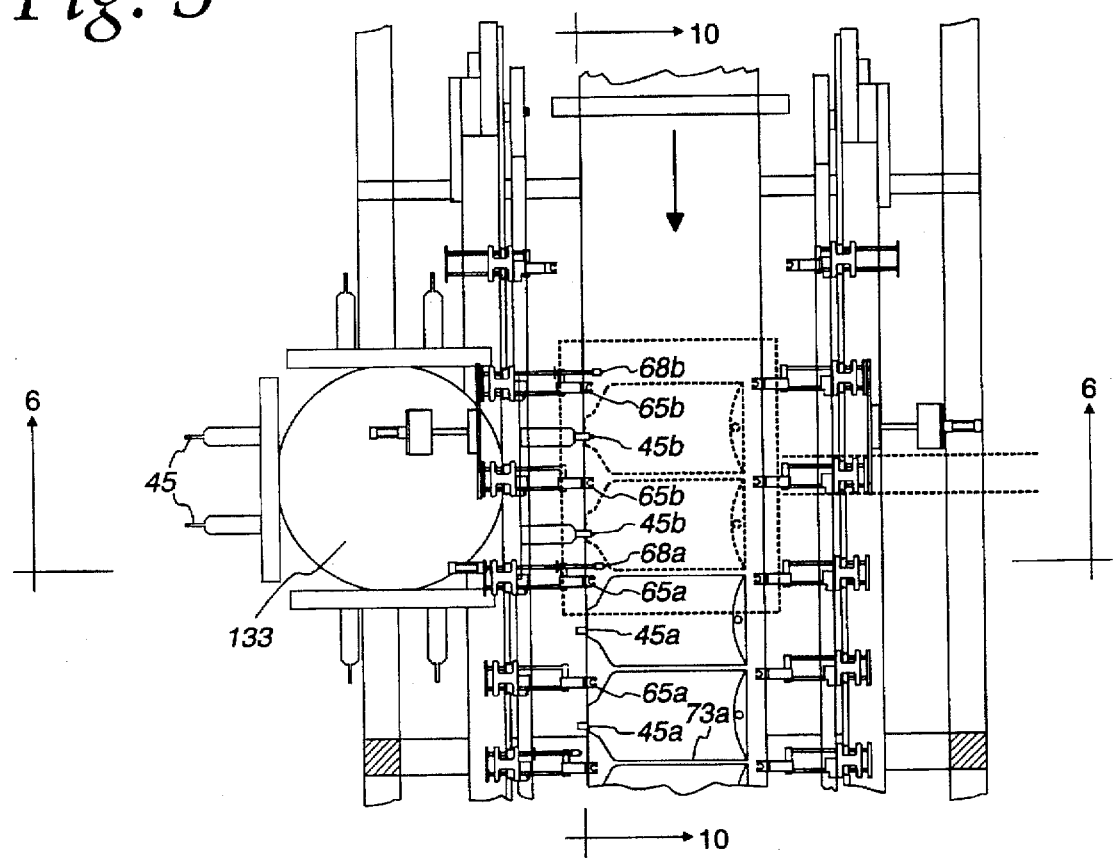
FIG. 5 is similar to FIG. 3, except that it shows the apparatus at a different phase in the manufacturing cycle.
Figure 6:
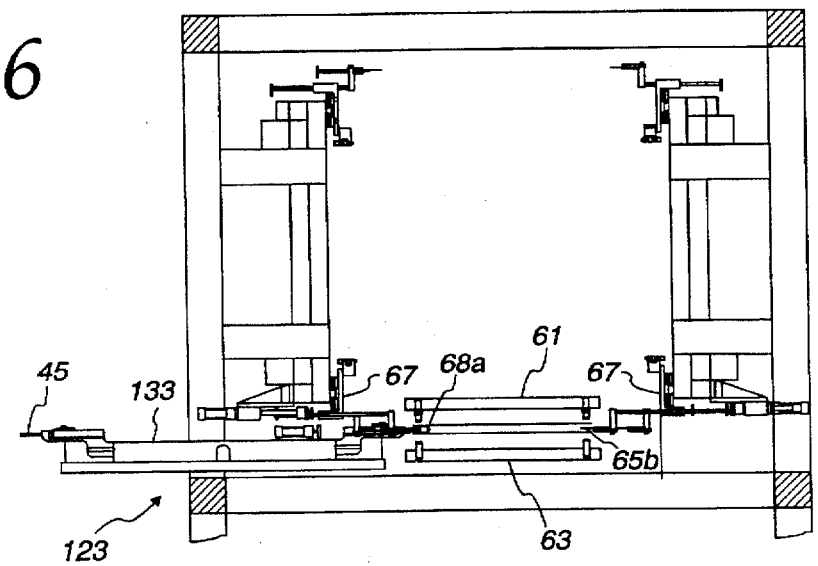
FIG. 6 is a sectional view of the apparatus taken along lines 6—6 of FIG. 5.

Turning to FIGS. 5, 6, and 10, in the gap provided by the separator 68a between the webs 51,53, the ports 45b are introduced into the gap between the webs. Although the separator 68a and ports 45b desirably are inserted at the same elevation, it is desirable for each pallet 67 to be disposed away from the ports 45 and the turret mechanism 123 in order to avoid interference. Here, the bodies of the respective pallets 67 are disposed at an elevation above that of ports 45b. Carriers 65b and separator 68b are moved into the inserted position. Separator 68b is inserted immediately upstream of the dies. The separator 68a then is retracted from its extended position, FIG. 11, and the turret 123 similarly may be retracted.

Figure 7:
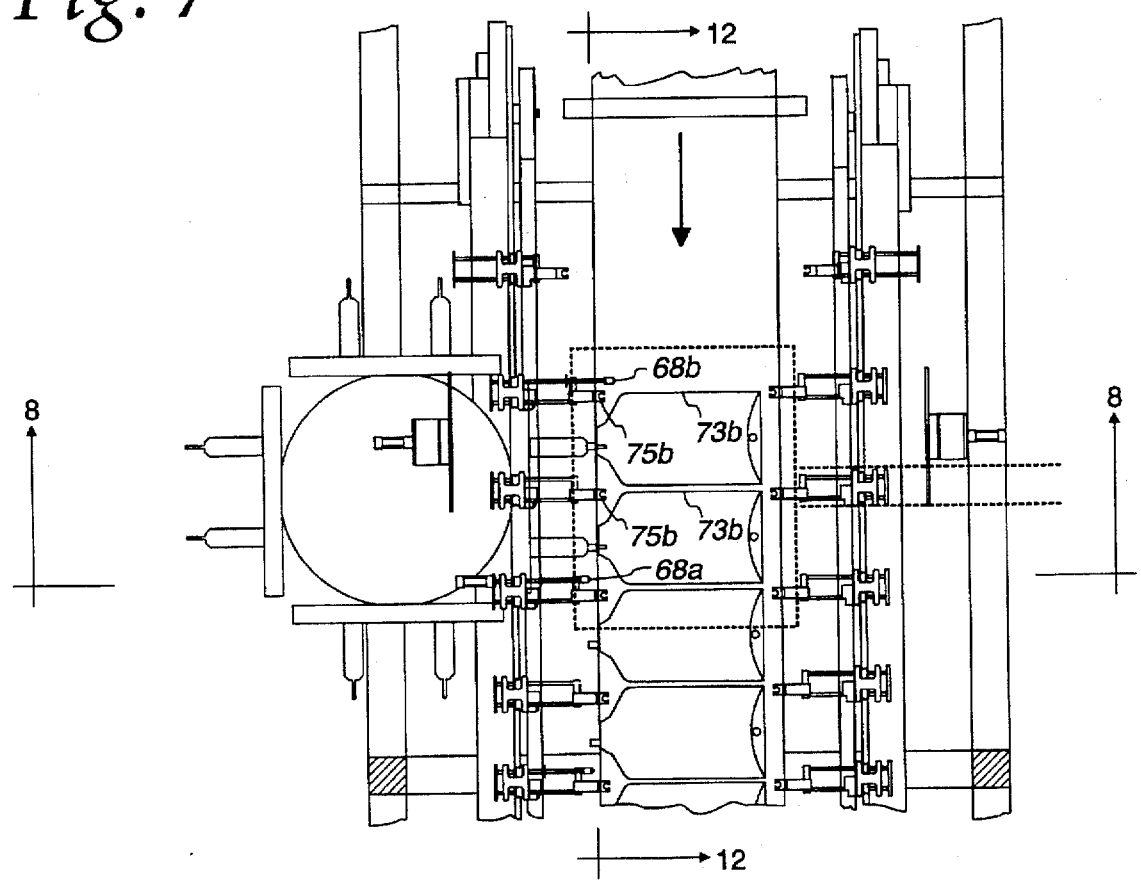
FIG. 7 is similar to FIG. 3, except that it shows the apparatus at the phase in a manufacturing cycle when the seals are being formed.
Figure 8:
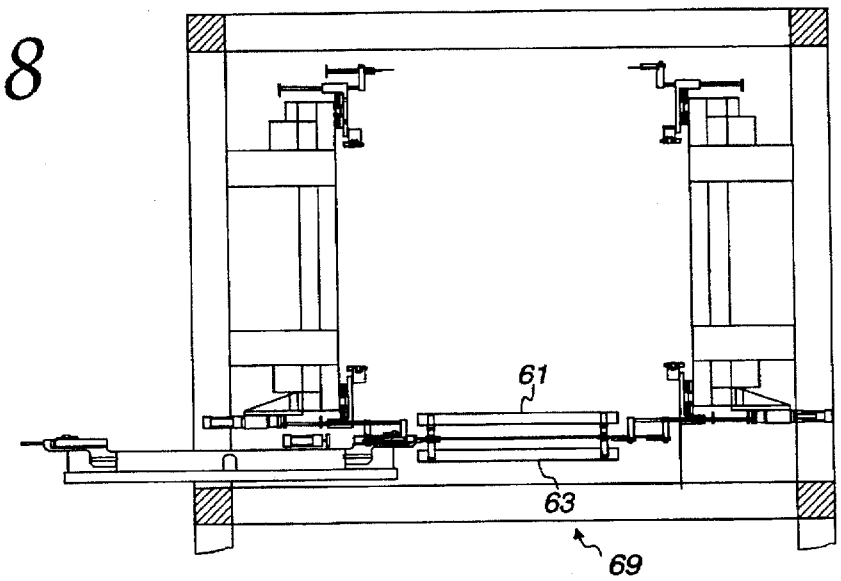
FIG. 8 is a sectional view of the apparatus taken along section lines 8—8 of FIG. 7.

Turning to FIGS. 7, 8, and 12, the dies 61,63 are brought together in order to form the package seals 73b and the carrier seals 75b.

The carrier seal is formed by a pair of upper and lower heat seal dies in the shape of buttons. The upper and lower dies convey heat seal button assemblies 183,185 which can be placed into contact with the webs 51,53 in the vicinity of the carrier 65 by bringing the dies 61,63 together. The illustrated button assemblies are dielectric heaters in the form of small block shaped bodies 186 (FIG. 19) with a web engaging pad 188 to engage and compress the plastic. An upper cylindrical end 190 on the button assembly is fastened to its associated die. The upper web 51 and the lower web 53 are sealed around one or more ports 45 by the dies 61,63 while at the same time the carrier seal 75 and the webs 51,53 are operatively connected to the carrier 65 by bringing the button assemblies 183,185 together along with the dies 61,63.

The carrier 65 preferably is nonconductive, in order to avoid carrying undue heat from the carrier sealing equipment 77 beyond the desired range of the carrier seal 75. The material for the carrier may be a composite material, and preferably is a composite fiberglass phenolic material. The material for the carrier 65 may be selected from the group consisting of composite materials, graphite, Kevlar, injection moldable plastic materials, rigid extrudable plastic materials, and metals including brass, titanium and nickel alloy. Other suitable materials may be used. The formation of the carrier seal 75 extrudes to the perimeter of the edge 79 of the opening of the carrier 65 even if the carrier is slightly misplaced with respect to its expected location, FIG. 18C. The paired button assembly 77 acts as a fixture to locate the carrier seal 75 in relation to the carrier 65, and also in relation to the webs 51,53, the package seal 73 and the ports 45. This spatial relationship is also important in other operations performed downstream such as cutting. Moreover, the use of a lightweight, thin, compact, and flexible carrier 65 assures that in the event of a web jam or other malfunction, the possibility of the dies 61,63 closing upon a misaligned carrier 65 will not seriously damage the expensive dies 61,63. Moreover, the carrier 65 is inexpensive and easily replaceable. The use of a non-metallic material may be advantageous in order to avoid interference with radio frequency generation, and in order to avoid problems with sealing operations, particularly dielectric sealing in close proximity to the carrier 65.

A flat or substantially flat profile for the carrier 65 is desirable in order to squarely contact the web material and to avoid scratching or breaking the material. The carrier 65 may have a shaped head 66, FIG. 20.

The shaped head 66 preferably has a circular shaped opening 81 therein, with the opening being continuous with a gap 81a in the end 66a opposite the end 64 at which the carrier is mounted on the pallet 67. The gap 81a preferably is smaller than the diameter of opening 81, such that a carrier seal 75 may be retained within the opening while the webs 51,53 are travelling downstream, but the carrier seal 75 may be slipped through the gap 81a by retracting the carrier away from the webs and/or by moving the carrier seal away from the carrier. The gap dimension may be about 50–97% of the diameter of the carrier opening, and preferably is about 55–70% of said diameter.

Other designs for the carrier 65 and the carrier seal may be selected depending on the particular application.

After sealing has been performed, FIGS. 7,8 and 12, the dies 61,63 are opened, FIG. 13, and the webs 51,53 are moved along downstream by the carriers 65b. Separator 68b will travel with the adjacent carrier 65b and their associated pallet, along with the webs, from the upstream edge of the dies to the downstream edge of the dies. The webs are now operatively connected by carrier seal 75b to the carrier, and thereby to the associated pallet and to the endless belt. The process is repeated in the next indexing cycle, FIGS. 3, 4, and 9.

The operating cycle in the vicinity of press station 69 will be described in greater detail in connection with FIGS. 9–13. The top web 51 and bottom web 53 pass around permanent separator 121 and proceed between the top die 61 and the bottom die 63. The webs 51 and 53 are pulled into the die region and two packages will be formed for each operation of the dies. It will be observed that separator 68a creates a gap of a predetermined distance between webs 51 and 53 permitting insertion of ports and carriers between the webs.

During the preceding sealing operation, the two bags 41a shown to the right of the dies 61,63 in FIG. 9 were formed. The carriers 65a are shown sealed in their respective positions with package seals 73a at each lateral edge of bags 41a, and with carrier seals 75a engaged by the carriers.

With the webs 51 and 53 separated, as shown in FIGS. 9 and 10, two ports 45b, two carriers 65b, and another separator 68b are inserted between the webs 51,53 at the edges thereof as shown in FIG. 10. The separator 65b is inserted immediately upstream of the sealing dies, so that it will not interfere with the sealing operation.

Then, as shown in FIG. 11, the separator 68a is retracted from between webs 51 and 53, thereby permitting webs 51 and 53 to collapse slightly, usually towards each other. The retraction of separator 68a from close proximity to dies 61 and 63 prevents interference therebetween in the next step.

In order to form the packages, the dies 61 and 63 are moved together as shown in FIG. 12 thereby forming package seals 73b and carrier seals 75b. The package seal 73b surrounds ports 45b and to this end grooves are formed in the dies 61,63. At the same time, carrier seals 75b are placed in the webs in the openings in carriers 65b, using the button assemblies provided for that purpose.

After the sealing operation, the dies 61 and 63 are separated, leaving newly formed package seals 73b, carrier seals 75b, and ports 45b now being incorporated into plastic bags 41b as shown in FIG. 13. Carriers 65b are now operatively connected to webs 51,53. The cycle may be repeated by again advancing webs 51 and 53 to the next indexing position while simultaneously advancing separator 68b from immediately upstream of the dies, as shown in FIG. 13 to the downstream edge of the dies, as shown in FIG. 9. The method then may be repeated as described above.

As an alternative to the embodiment shown, it is feasible to insert the carriers 65 and the ports 45 in a separate operation, or even a separate station, prior to the operation of the seal press 71 and the radio frequency generator 143 forming the bag seals 73. This alternative permits injection molded ports or fittings to be cleared of possible occlusions by a mandrel which can be brought in between the webs 51,53 from the web edges opposite the ports prior to the formation of bag seals 73.

Turning now to FIG. 14, a plan view of the pallet 67 provided with the carrier 65 and retractable separator 68 of the invention is shown. The carrier 65 and separator 68 are extended to their fully operative positions by engaging the primary push plate 145 thereby extending shafts 147,149 through bushings 151,153 in primary plate-mandrel 167 provided for that purpose. The shafts 147,149 are provided with detents 155,157 for engagement by a brake 161 operated by means of a spring 163. The carrier 65 is mounted onto the pallet 67 with dowels 165 and bolt 166, or other suitable fastening means. The carrier 65 is quickly and easily replaceable by removing dowels 165 and bolt 166, and replacing the carrier 65, the dowels 165 and the bolt 166. The retractable separator 68 has a shaft 158 which is extended into the operative position by engagement of the secondary push plate 159 forcing the separator shaft 158 through a secondary plate-mandrel 160 until the separator 68 is fully extended relative to the pallet 67. Preferably, the extension of separator shaft 158 and separator 68 relative to pallet 67 takes place at scrap removal station 103, FIG. 4. The separator 68 may be held in the selected position, whether extended or retracted, by detents 162 in the separator shaft 158 engaging the secondary plate-mandrel 160. The separator 68 preferably is provided with a head 170 having a tapered end 171 which is shown in the preferred bullet-nose shape with a tapered end 171 in order to provide a certain and smooth entry between the webs 51,53. Alternatively, the end 171 of the separator may have a duckbill shape (not shown) or another shape adapted for insertion between webs 51,53. The head 170 of the separator 68 should have a diameter larger than the ports 45 to be inserted between the webs 51,53, preferably 30 to 40% larger than the diameter of such ports.

In the embodiment shown for a two-up press, it is unnecessary to provide a separator on every pallet; therefore, alternative pallets on the port side of the webs are provided with a carrier only, FIGS. 3, 15. On the opposite side of the webs, no retractable separator is necessary because no ports are introduced on that side. Accordingly, the pallets on the non-port side are provided with carriers only and may be mirror images of the pallet of FIG. 15. See, e.g., FIGS. 2 and 3. It will be observed that retractable separators may be provided in whatever locations may be desired for a given manufacturing set-up.

The preferred means to attach the pallets to the endless cog belts 83 is in the form of a cog pin 173, FIG. 14. The cog pin 173 is connected to the cog belt and the cog pin pulls the pallet 67 along with the grooved wheels or rollers 105 on the carrier rolling along upper and lower edges of an endless, stationary guide bar 175 on the machine frame.

It will be observed that in operation, the ports 45 to be loaded between the webs 51,53 are loaded in the same plane as the separator 68 and carrier 65, which in the preferred embodiment is below the plane of the primary shafts 147, 149. The specific geometry and orientation of the carrier 65 and separator 68 and the related pallet components are a matter of design choice and may be modified without departing from the spirit of the invention.

Referring again to FIGS. 1a and 2, the carriers 65 grip and move the webs 51,53 from the seal station 69 into the cut station 91. At the cut station 91, the article, package or bag 41 may be cut or separated from the webs 51,53. Preferably, the separation or cutting may be performed by an ultrasonic cutting unit 90 bearing two knives 93, see FIG. 1a. At the cutting station 91, if ultrasonic cutting is performed, the articles 41 may be drawn into the desired shape by a lower vacuum plate 99 in the form of the articles, prior to cutting.

At the cut station 91, the cutters 93a of the ultrasonic knives 93 may be moved into position by a carriage 74-mounted upper plate 98, while the lower vacuum plate 99 may be mounted on and moved into position by a piston 100. The ultrasonic curing unit 90 preferably is provided with the ability to move along at least three axes, through the use of multiple carriages, and also is equipped with a rotating motor, thereby providing considerable flexibility with respect to cutting patterns. Alternatively, the separation or cutting may be performed by a die cutter, tear seal, or the like. At the cutting station 91 or at another station, an opening 50 may be formed in the bag 41 along the edge 49 opposite the tube members 45, FIG. 24. The carriers may be retracted by pusher/retractor devices 135 at the cut station 91 similar to the pusher/retractors 135 provided at seal station 69. The components of cut station 91, as well as other components in apparatus 31, may be equipped for numerical or computer control.

The article 41 may be removed from its operative connection to the endless belts 83 at transfer station 97 by a suction-cup or other type of gripper 92 which may elevate the article 41 slightly and then place it downwardly onto an off-load conveyor 95 at discharge station 96. The bag transfer station 97 preferably is intimately sequenced with the cut station 91. Other mechanisms and methods for transfer and discharge of the articles also may be used. It will be understood that alternatively the product 41 may be left in the continuous webbing for subsequent use, e.g., as a multi-layer web, or as a continuous web of plastic bags separable because of tear seals, or perforations or the like.

Assuming, however, as shown in FIG. 1a, that the finished article 41 is cut out of the webs 51,53 at the cut station 91 and is transferred at station 97 to discharge station 96, there normally will be a piece of scrap material 101 which remains operatively connected to the carrier 65 and which will continue to move with the carrier 65 and pallet 67 along the endless belt 83 until the scrap 101 is removed at a scrap removal station 103, FIGS. 1a, 4. The use of the carrier 65 and separator 68 permits efficient use of the webs 51,53 with a minimum of scrap, such that the scrap material may be reduced by as much as 1 to 1½% or more as a percentage of the total web material. A large part of the savings is due to elimination of most of the scrap between adjacent die operations. The actual percentage of scrap material for a given operation will depend on the design of the articles 41 to be produced as well as the design of the dies 61,63 and the other components, not including scrap generated as a function of equipment malfunction, operator error, material defects, specifications or tolerances, and other parameters. It will be understood that in the event that the finished articles 41 can be formed without any waste material whatsoever, there will be no scrap material 101 and hence no need for a scrap removal station 103. Generally, however, assuming that scrap material 101 is present after the cut station 91 and the bag transfer station 97, the carrier 65 will proceed with the scrap 101 to a scrap removal station 103 where the scrap 101 will be removed from the carrier 65, FIGS. 1a, 4.

The scrap 101 may be removed from carrier 65 by grippers 102 which grasp the scrap, FIG. 4. The scrap 101 is held in place by the grippers while carrier placement cylinders 104 and carrier catcher/positioners 106 retract carriers 65, thereby slipping carrier seals 75 through gaps 81a in the carriers. Desirably, the carrier placement cylinders 104 will place the separator 68 in the extended position relative to the pallet 67 leaving the scrap removal station 103, with the pallets 67 in the retracted position. The pallet 67 and its components thus will be in proper position for engagement by pusher 135 in the subsequent sequence of seal station 69, FIG. 3. At the scrap removal station 103, FIG. 4, the scrap 101 may be dropped by the grippers 102 onto a conveyor (not shown) for transport to a receptacle (not shown) for disposal or recycle material.

Preferably, the retractable separators 68 and the carriers 65 are removably mounted on pallets 67, and the pallets are removably mounted on a pair of endless belts 83.

Figure 16:
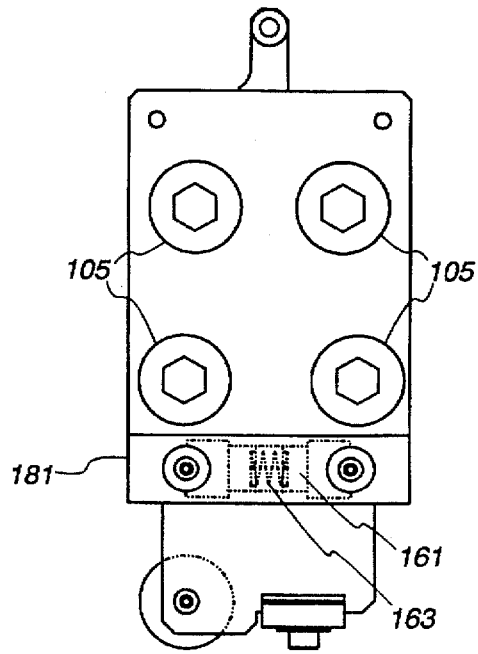
FIG. 16 is an end view of the pallet shown in FIGS. 1 and 14.

Preferably, each endless belt 83 is a steel-impregnated cog belt of such size and strength to suit its purpose, pre-stressed to avoid unnecessary slack or stretch in the system, in order to assure precise, accurate, and repeatable movements of the parts associated with the belt 83 throughout the system 31. Alternatively, other suitable belts, chains, or the like may be used. Each pallet preferably has four bearings 105, see FIGS. 1 and 16. As shown in FIG. 1a, the bearings 105 travel along a track 107 and along each of the four corners 109 of the track the radius of the track is undersized so that only three of the bearings 105 will be in contact with the track 107. In the straightaway portions of the track 107, all four bearings 105 of the pallet 67 will be in contact with the track, thereby providing such rigidity and stability of the pallet as may be desired.

Alternatively, the retractable separator 68 and/or the carrier 65 may be mounted directly or indirectly onto belt 83, or a chain, or the like.

In accordance with the invention, bags 41 may be manufactured in a variety of sizes and shapes, for example a standard three liter bag may be produced. Bags may be fifty milliliters or smaller, five liters or larger, or any size in between. Similarly, the sizes and shapes for tubes or ports 45 may be selected or designed as may be suitable for the desired application. A typical bag 41 produced in accordance with the invention, is shown in FIG. 22.

The invention may be used with films or webs 51,53 of one or more materials selected from the group including polyvinyl chloride (PVC), polyamides, polyethylene, and polypropylene. Polyvinyl chloride is preferred, but blends may be used or coextruded materials may be used, or other thermoplastics also may be used. Thermal sealing, dielectric sealing, ultrasonic sealing, or other sealing technology may be used to seal the webs together. The invention is applicable to laminated films which may include two or more layers selected from the aforementioned materials. Inlet/outlet tubes 45 may be made from a variety of appropriate materials such as hard PVC, polypropylene, polyamides, polycarbonates, polyesters, polyacrylates and the like and/or copolymers thereof and styrene-containing copolymers thereof, ethylene vinyl acetate (EVA) tubing, or rigid polycarbonate ports with EVA bonding sleeves. The material for the tubes may be any material that is capable of extrusion or molding. The preferred material for tube members 45 is hard PVC. Depending on the use, the tube or port members 45 may be rigid or they may be flexible. In addition to the uses disclosed above, the invention may also be used in a variety of other medical and pharmaceutical applications, for containers of chemicals, solutions and the like, in the manufacture of complex or multi-layer films or packages for food and non-food applications, for frozen food packaging, for hygienic applications, and in other applications making use of multiple webs of plastic materials.

It will be understood that the present invention while illustrated in connection with specific examples described above and illustrated in the accompanying drawings is not limited to those examples or those drawings, but is to be given its full scope as defined in the spirit of the accompanying claims.

What is claimed is:

1. An apparatus for manufacturing an article formed from multiple webs with a seal formed between the webs, the apparatus comprising:

a guide for guiding the webs and for spacing the webs;

a conveyor for conveying the webs along a predetermined path of travel to a sealing station;

a sealer for sealing the webs together to form a seal at the sealing station;

a retractable web separator for temporary insertion between the spaced webs to provide a gap between the webs adjacent the sealing station;

means for transporting the retractable web separator in the direction of web travel and for travel to a location adjacent the sealer station;

means for inserting the retractable web separator between the spaced webs to provide the gap between the webs for performance of an operation in the gap between the webs and for withdrawing the retractable web separator from the gap between the webs at a location adjacent the sealer; and means for performing the operation in the gap between the webs.

2. An apparatus in accordance with claim 1 wherein the retractable separator comprises a reciprocating shaft and a shaped head on the shaft for insertion between the spaced webs.

3. An apparatus in accordance with claim 1 wherein the guide comprises a stationary separator for spacing the webs, and the retractable web separator has a size to maintain the webs substantially parallel between the stationary separator and the retractable web separator when the retractable web separator is inserted between the spaced webs.

4. An apparatus in accordance with claim 1 wherein the means for transporting the retractable web separator comprises an endless carrier for carrying the retractable web separator along an endless path of repeated travel to an upstream position for insertion between the webs and to travel downstream towards the sealer station.

5. An apparatus in accordance with claim 4 including a drive for the endless carrier to move the endless carrier and the retractable web separator at a travel speed matched to the travel speed of the webs.

6. An apparatus in accordance with claim 1 wherein the retractable web separator comprises a reciprocable rod, and the means for inserting and retracting the reciprocable rod comprises a slide carrier and a fluid motor to slide the rod on the carrier.

7. An apparatus in accordance with claim 6 wherein a plurality of retractable web separators are provided in the form of elongated rods, and the means for transporting the retractable web separators comprises an endless carrier with the rods spaced at equal intervals therealong.

8. An apparatus in accordance with claim 1 in which webs are elongated webs to be joined together into a series of connected bags;

the sealer joins the webs together with seals to form bags at a stationary sealing station;

a bag conveyor conveys the bags to a cutting station;

a cutter at the cutting station severs individual bags from the webs at the cutting station to form discrete, separated, individual bags; and a bag transfer mechanism transfers the individual bags to a discharge station for discharge of the bags.

9. An apparatus in accordance with claim 8 including a scrap station at which scrap remaining from formation of the bags is removed from the conveyor.

10. An apparatus for manufacturing an article formed from multiple webs with a seal formed between the webs, the apparatus comprising:

a guide for guiding the webs and for spacing the webs;

a conveyor for conveying the webs along a predetermined path of travel to a sealing station;

a sealer for sealing the webs together to form a seal at the sealing station;

a retractable web separator for temporary insertion between the spaced webs to provide a gap between the webs adjacent the sealing station;

means for transporting the retractable web separator in the direction of web travel and for travel to a location adjacent the sealer station;

means for inserting the retractable web separator between the spaced webs to provide the gap between the webs for performance of an operation in the gap between the webs and for withdrawing the retractable web separator from the gap between the webs at a location adjacent the sealer; and means for inserting a member into the gap between the webs and adjacent the retractable separator.

11. Apparatus for manufacturing an article formed from multiple webs comprising:

means for supplying multiple webs having elongated edges;

gripping means disposed on opposite lateral sides of the webs for gripping the longitudinal edges of the webs;

a conveyor for carrying a series of gripping means in an endless path and for conveying the webs gripped by the gripping means;

means for inserting a retractable web separator between the edges of the webs for providing a predetermined gap between said edges and for retracting the web separator from between the plastic webs;

means for inserting a member into the gap between the webs adjacent a sealer station; and a sealer at the sealer station for forming an article seal between the webs and adjacent the member.

12. An apparatus in accordance with claim 11 wherein the conveyor also carries a series of retractable web separators in an endless path.

13. An apparatus in accordance with claim 11 wherein the retractable web separator is inserted upstream of the sealer and is retracted before the article seal is formed.

14. An apparatus in accordance with claim 13 wherein the retractable web separator travels along with the webs in substantially the same direction and at substantially the same speed as the webs during the time that the separator is inserted between the webs.

15. An apparatus for forming bags with ports from a pair of plastic webs, said apparatus comprising:

a guide for guiding the pair of webs face to face into a sealing station;

a sealer at the sealing station to fuse the webs to form seals between the webs to form bags;

an inserter for insertion of at least a port into position between the webs to be sealed by the sealer to the webs and to the package being formed;

a retractable web separator for separating the webs by a sufficient gap and for a sufficient period of time for the port to be inserted between the webs;

a conveyor for transporting the webs;

opposed gripping means on the conveyor for insertion between opposite longitudinal edges of the webs for gripping the webs and moving them forwardly; and a cutter for cutting the bags to form individual discrete bags to be transferred to a discharge station.

16. An apparatus in accordance with claim 15 wherein a means carries the web separator forwardly toward the sealing station to travel with the webs; and a discharge means at a discharge station transfers the bags for the discharge thereof.

17. An apparatus in accordance with claim 15 wherein reciprocators carry the retractable separator for rectilinear insertion travel into a space between the webs at the sealer station and for retraction travel prior to sealing.

18. A method of manufacturing a product formed from multiple webs comprising:

feeding the webs into facing relationship with one another;

inserting a retractable separator between said webs to space the webs apart for making the product;

gripping said webs with a carrier to move the product being formed forward;

performing an operation in the space between the webs;

retracting the web separator from between webs;

forming a product from the webs;

discharging the product; and disconnecting the carrier from the webs.

19. The method of claim 18 wherein there are two webs.

20. A method of manufacturing a package formed from multiple webs comprising:

feeding the webs into facing relationship with one another;

providing a retractable web separator to separate the webs and a gripping device to grip said webs;

inserting a port between said separated webs;

retracting the web separator;

sealing the webs together to form a package seal;

moving the webs and the gripping device along a predetermined path;

cutting the sealed webs to form a package having a seal around a substantial portion of its perimeter and having a port; and disconnecting the gripping device from the webs.

21. The method of claim 20 including providing a shaped head on the retractable web separator.

22. A method of manufacturing an article formed from two webs comprising:

feeding the webs into a facing relationship with one another;

inserting a retractable separator between said webs to provide a predetermined distance between said webs;

inserting a member in between the facing surfaces of said webs;

retracting said separator;

sealing said webs together; and cutting an article from said webs in the vicinity of said seal.

* * * * *

UNITED STATES PATENT AND TRADEMARK OFFICE
CERTIFICATE OF CORRECTION

PATENT NO. : 5,690,600

DATED : November 25, 1997

INVENTOR(S) : Sungwook Yang, et al.

It is certified that error appears in the above-indentified patent and that said Letters Patent is hereby corrected as shown below:

Column 14, Line 5: delete "curing" and insert --cutting--

Signed and Sealed this

Seventh Day of July, 1998

Attest:

BRUCE LEHMAN

Attesting Officer

Commissioner of Patents and Trademarks